(12) United States Patent
Bedekar et al.

(10) Patent No.: US 9,026,152 B2
(45) Date of Patent: May 5, 2015

(54) SYSTEM AND METHOD FOR PAGING AND LOCATING UPDATE IN A NETWORK

(75) Inventors: Anand S. Bedekar, Arlington Heights, IL (US); Rajeev Agrawal, Northbrook, IL (US); Venkat Gopikanth, Buffalo Grove, IL (US); Suresh Kalyanasundaram, Bangalore (IN); Vishnu Ram Ov, Trivandrum (IN)

(73) Assignee: Google Technology Holdings LLC, Mountain View, CA (US)

( * ) Notice: Subject to any disclaimer, the term of this patent is extended or adjusted under 35 U.S.C. 154(b) by 1136 days.

(21) Appl. No.: 11/913,942

(22) PCT Filed: Jun. 19, 2006

(86) PCT No.: PCT/US2006/023728
§ 371 (c)(1),
(2), (4) Date: Nov. 9, 2007

(87) PCT Pub. No.: WO2007/001950
PCT Pub. Date: Jan. 4, 2007

(65) Prior Publication Data
US 2008/0194271 A1 Aug. 14, 2008

(30) Foreign Application Priority Data
Jun. 21, 2005 (IN) .............................. 535/KOL/2005

(51) Int. Cl.
*H04Q 7/20* (2006.01)
*H04W 68/00* (2009.01)
*H04W 80/04* (2009.01)

(52) U.S. Cl.
CPC .............. *H04W 68/00* (2013.01); *H04W 80/04* (2013.01)

(58) Field of Classification Search
CPC ..... H04W 8/085; H04W 92/02; H04W 76/00; H04W 80/045; H04W 80/04; H04W 8/26; H04W 36/0011; H04L 61/2084
USPC ............ 455/458, 456.1, 456.2, 456.3, 456.4, 455/456.5; 713/171; 709/230, 218, 238; 370/349, 328, 338
See application file for complete search history.

(56) References Cited

U.S. PATENT DOCUMENTS 5,506,838 A 4/1996 Flanagan
6,195,555 B1 2/2001 Dent
(Continued)

FOREIGN PATENT DOCUMENTS

EP 0777396 A1 6/1997
EP 1259026 A1 11/2002
(Continued)

OTHER PUBLICATIONS

Wikipedia Article from Internet: "Global System for Mobile Communications", Apr. 17, 2005,http://web.archive.org/web/20050417021658/http://de.wikipedia.org/wiki/Global_System_for_Mobile_Communications, Mar. 27, 2008, pp. 1-13.
(Continued)

*Primary Examiner* — Fred Casca
(74) *Attorney, Agent, or Firm* — Faegre Baker Daniels LLP

(57) ABSTRACT

Mobile station information is exchanged between a plurality of distributed mobility agents (106, 108). The exchange is initiated by a mobility agent (106) associated with a last known network access point (110) that has communicated with the mobile station (114). The mobile station (114) is paged from at least one network access point using an available air interface technology to interface with the mobile station (114) and using the mobile station information. No centralized controller is used in the paging.

6 Claims, 3 Drawing Sheets

(56) References Cited

U.S. PATENT DOCUMENTS

| | | | |
|---|---|---|---|
| 6,230,012 B1 | 5/2001 | Willkie et al. | |
| 6,285,880 B1 | 9/2001 | Gagnon et al. | |
| 6,430,698 B1 | 8/2002 | Khalil et al. | |
| 6,473,413 B1 | 10/2002 | Chiou et al. | |
| 6,567,664 B1 | 5/2003 | Bergenwall et al. | |
| 6,578,085 B1 | 6/2003 | Khalil et al. | |
| 6,711,408 B1 | 3/2004 | Raith | |
| 6,721,565 B1 | 4/2004 | Ejzak et al. | |
| 6,795,857 B1 | 9/2004 | Leung et al. | |
| 6,795,891 B2 | 9/2004 | Lin | |
| 6,813,501 B2 | 11/2004 | Kinnunen et al. | |
| 6,859,653 B1 | 2/2005 | Ayoub et al. | |
| 6,977,938 B2 | 12/2005 | Alriksson et al. | |
| 7,016,682 B2 | 3/2006 | Won et al. | |
| 7,096,273 B1 | 8/2006 | Meier | |
| 7,139,833 B2 | 11/2006 | Heller | |
| 7,162,529 B2 | 1/2007 | Morishige et al. | |
| 7,289,463 B2 | 10/2007 | Ozugur | |
| 7,336,670 B1 | 2/2008 | Calhoun et al. | |
| 7,349,380 B2 | 3/2008 | Barker, Jr. et al. | |
| 7,450,544 B2 | 11/2008 | Rue | |
| 7,486,670 B2 | 2/2009 | Kinoshita et al. | |
| 7,512,687 B2 | 3/2009 | Jung | |
| 7,606,194 B2 | 10/2009 | He | |
| 7,649,866 B2 | 1/2010 | Chari et al. | |
| 7,733,829 B2 | 6/2010 | Lee et al. | |
| 7,860,067 B2 | 12/2010 | Na et al. | |
| 2001/0024443 A1 | 9/2001 | Alriksson et al. | |
| 2002/0009066 A1 | 1/2002 | Shimizu et al. | |
| 2002/0015395 A1 | 2/2002 | Karagiannis | |
| 2002/0015396 A1 | 2/2002 | Jung | |
| 2002/0021680 A1 | 2/2002 | Chen | |
| 2002/0026527 A1 | 2/2002 | Das et al. | |
| 2002/0034166 A1 | 3/2002 | Barany et al. | |
| 2002/0046287 A1* | 4/2002 | La Porta et al. | 709/230 |
| 2002/0057657 A1 | 5/2002 | LaPorta et al. | |
| 2002/0075844 A1 | 6/2002 | Hagen | |
| 2002/0080752 A1 | 6/2002 | Johansson et al. | |
| 2002/0094813 A1 | 7/2002 | Koshimizu et al. | |
| 2003/0016655 A1 | 1/2003 | Gwon | |
| 2003/0018810 A1 | 1/2003 | Karagiannis et al. | |
| 2003/0035387 A1 | 2/2003 | Kim | |
| 2003/0076837 A1 | 4/2003 | Whitehill et al. | |
| 2003/0104813 A1 | 6/2003 | Julka et al. | |
| 2003/0148777 A1* | 8/2003 | Watanabe et al. | 455/458 |
| 2003/0174709 A1 | 9/2003 | Shankar | |
| 2003/0202505 A1 | 10/2003 | Ozugur | |
| 2003/0235176 A1 | 12/2003 | Zhang et al. | |
| 2004/0005884 A1 | 1/2004 | Nieminen et al. | |
| 2004/0013099 A1 | 1/2004 | O'Neill | |
| 2004/0022212 A1 | 2/2004 | Chowdhury et al. | |
| 2004/0023653 A1 | 2/2004 | O'Neill | |
| 2004/0024901 A1 | 2/2004 | Agrawal et al. | |
| 2004/0034075 A1 | 2/2004 | Focsaneanu | |
| 2004/0043791 A1 | 3/2004 | Reddy | |
| 2004/0047322 A1 | 3/2004 | O'Neill | |
| 2004/0063455 A1 | 4/2004 | Eran et al. | |
| 2004/0066760 A1 | 4/2004 | Thubert et al. | |
| 2004/0071109 A1 | 4/2004 | Herle et al. | |
| 2004/0082330 A1 | 4/2004 | Marin | |
| 2004/0114559 A1 | 6/2004 | Wang | |
| 2004/0133684 A1 | 7/2004 | Chan et al. | |
| 2004/0185852 A1 | 9/2004 | Son et al. | |
| 2004/0213181 A1 | 10/2004 | Grech et al. | |
| 2004/0213260 A1 | 10/2004 | Leung et al. | |
| 2004/0242233 A1 | 12/2004 | Lutgen | |
| 2004/0259567 A1* | 12/2004 | Valko et al. | 455/456.1 |
| 2005/0047399 A1 | 3/2005 | Lee et al. | |
| 2005/0088994 A1 | 4/2005 | Maenpaa et al. | |
| 2005/0113091 A1 | 5/2005 | Rodriguez et al. | |
| 2005/0122946 A1 | 6/2005 | Won | |
| 2005/0128975 A1 | 6/2005 | Kobayashi et al. | |
| 2005/0135286 A1 | 6/2005 | Nurminen et al. | |
| 2005/0135422 A1 | 6/2005 | Yeh | |
| 2005/0148368 A1 | 7/2005 | Scheinert et al. | |
| 2005/0163080 A1 | 7/2005 | Suh et al. | |
| 2005/0180372 A1 | 8/2005 | Cho et al. | |
| 2005/0185632 A1 | 8/2005 | Draves, Jr. et al. | |
| 2005/0213546 A1 | 9/2005 | Reitter et al. | |
| 2005/0232286 A1 | 10/2005 | Lee et al. | |
| 2006/0104247 A1 | 5/2006 | Dommety et al. | |
| 2006/0112183 A1* | 5/2006 | Corson et al. | 709/230 |
| 2006/0142034 A1 | 6/2006 | Wentink et al. | |
| 2006/0193272 A1 | 8/2006 | Chou et al. | |
| 2007/0115883 A1 | 5/2007 | Narayanan et al. | |
| 2008/0025362 A1 | 1/2008 | Yamamoto et al. | |
| 2008/0167037 A1 | 7/2008 | Bedekar et al. | |
| 2008/0186964 A1 | 8/2008 | Bedekar et al. | |
| 2008/0192663 A1 | 8/2008 | Bedekar et al. | |
| 2008/0212562 A1 | 9/2008 | Bedekar et al. | |
| 2008/0240037 A1 | 10/2008 | Bedekar et al. | |

FOREIGN PATENT DOCUMENTS

| | | | |
|---|---|---|---|
| EP | 1404143 A2 | 3/2004 | |
| EP | 1263182 B1 | 12/2008 | |
| EP | 1404143 B1 | 11/2011 | |
| WO | 0045560 | 8/2000 | |
| WO | 03049377 A1 | 6/2003 | |
| WO | 2004073324 A2 | 8/2004 | |
| WO | 2004073325 A2 | 8/2004 | |
| WO | 2007001948 A2 | 1/2007 | |

OTHER PUBLICATIONS

Chuah, M.C. et al.: Mobile Virtual Private Dial-up Services:, Bell Labs Technical Journal; Bell Laboratories; U.S., vol. 4, No. 3, Jul. 1999, pp. 51-72.

Perkins, Charles et al: "IMHP: A Mobile Host Protocol for the Internet", in Proceedings of INET'94/JENC5, (1994), all pages.

Wu, Chun-Hsin et al.: "Bi-direction Route Optimization in Mobile IP over Wireless LAN", Vehicular Technology Conference, 2002, Proceedings. VTC 2002-Fall, 2002 IEEE 56th, all pages.

Perkins, C.: "IP Mobility Support for IPv4", Network Working Group, Request for Comments: 3344, Nokia Research Center, Aug. 2002, all pages.

R. Caceres and V.N. Padmanbhan: "Fast and Scalable Wireless Handoffs in Support of Mobile Internet Audio", ACM J. Mobile Net. and Appl., v3, No. 4, Dec. 1998, all pages.

Gustafsson Eva et al.: "Mobile IPv4 Regional Registration", draft-ietf-mobileip-reg-tunnel-09.txt, Mobile IP Working Group Internet Draft, Jun. 25, 2004, all pages.

Ericsson, "low Latency Handoffs in Mobile IPv4", Network Working Group, Internet-Draft, Expires Dec. 2004, Jun. 2004, draft-ietf-mobileip-lowlatency-handoffs-v4-09.txt, all pages.

Soliman, Hesham et al.: Hierarchical Mobile IPv6 Mobility management (HMIPv6), draft-ietf-mipshop-hmipv6-03.txt, Network Working Group, Expires: Apr. 2005, Oct. 2004, all pages.

Kempf, James et al.: "Post-handover Mobile Initiated Tunneling for Fast Mobile IPv4 Handover", draft-kempf-mobileip-postmit-handover-00.txt, Expires: Jun. 2002, all pages.

Fathi, Hanane et al: "Mobility Management for VoIP in 3G Systems: Evaluation of Low-Latency Handoff Schemes", IEEE Wireless Communications, Apr. 2005, 1536-1284/05, pp. 96-104.

Perkins, C: "IP Mobility Support", Network Working Group, Request for Comments: 2002 IBM, Oct. 1996, all pages.

Translation of the Official Communication from the German Patent and Trademark Office date Aug. 19, 2011, all pages.

German Patent and Trademark Office, Office Action for German Patent Application No. 10 2006 001 710.1 dated Sep. 6, 2012, 8 pages.

Andy Wilton, "The Benefits of All-IP Networks", Presentation for the 3G Mobile Summit, Brussels, Jun. 2001. http://ipv6if.org/PublicDocuments/ThebenefitsofALL-IPnetworks.pdf [accessed on Aug. 16, 2012].

(56) References Cited

OTHER PUBLICATIONS

Ramjee, R. et al. "IP-base access network infrastructure for next-generation wireless data networks", Personal Communications, IEEE, vol. 7 (4) 34-41, Aug. 2000; DOI:10.1109/98.863994.
United States Patent and Trademark Office, "Non-Final Rejection" for U.S. Appl. No. 11/913,944 dated Nov. 29, 2012, 15 pages.
United States Patent and Trademark Office, "Non-Final Rejection" for U.S. Appl. No. 11/913,944 dated Oct. 21, 2013, 14 pages.
United States Patent and Trademark Office, "Final Rejection" for U.S. Appl. No. 11/913,939 dated Aug. 21, 2014, 14 pages.
United States Patent and Trademark Office, "Non-Final Rejection" for U.S. Appl. No. 11/913,939 dated May 6, 2014, 13 pages.

* cited by examiner

SYSTEM AND METHOD FOR PAGING AND LOCATING UPDATE IN A NETWORK

RELATED APPLICATIONS

This application relates to the following patent applications as were filed on even date herewith (wherein the contents of such patent applications are incorporated herein by this reference):

METHOD AND APPARATUS TO FACILITATE COMMUNICATIONS USING SURROGATE AND CARE-OF INTERNET PROTOCOL ADDRESSES Ser. No. 11/913,939;

ADDRESS RESOLUTION PROTOCOL-BASED WIRELESS ACCESS POINT METHOD AND APPARATUS Ser. No. 11/913,940;

METHOD AND APPARATUS TO FACILITATE MOBILE STATION COMMUNICATIONS USING INTERNET PROTOCOL-BASED COMMUNICATIONS Ser. No. 11/913,944;

METHOD AND APPARATUS FOR REDUCING LATENCY DURING WIRELESS CONNECTIVITY CHANGES Ser. No. 11/913,936;

SYSTEM AND METHOD FOR PROVIDING A DISTRIBUTED VIRTUAL MOBILITY AGENT Ser. No. 11/913,937; and METHOD, APPARATUS, AND SYSTEM FOR ESTABLISHING A DIRECT ROUTE BETWEEN AGENTS OF A SENDER NODE AND A RECEIVER NODE Ser. No. 11/913,935.

FIELD OF THE INVENTION

The field of the invention relates to routing communications through networks, and more specifically to providing for paging and location updates within these networks.

BACKGROUND OF THE INVENTION

The Mobile Internet Protocol (MIP) represents a network-level approach for supporting the mobility of mobile stations across various networks and/or sub-networks. When a mobile station moves from its home network to operate in a foreign network, a home agent associated with the mobile station tunnels data packets destined for the mobile station to a Care-of-Address (CoA) associated with the mobile station. The CoA may be associated with a foreign agent. Data packets destined for the mobile station can then be tunneled to the foreign agent and, subsequently, delivered to the mobile station.

When operating in wireless networks, mobile stations exchange information across data links, which typically operate in a number of modes. For example, the link may operate in a "connected" mode, wherein the data link carries information between the mobile station and access points. In another example, a data link may operate in an "idle" mode, where the link transfers no data. The idle mode allows a mobile station to conserve power by not requiring the mobile station to report its location to the network each time it crosses a boundary of the transmission domain or cell of an access point. Typically, the network is configured so that a group of cells comprise a paging, location, or routing area, and the mobile station is required to report its updated location only upon crossing the boundary of the location area. A mobile station invokes a location update procedure to report its location. Consequently, if the network desires to communicate with the mobile station while in idle mode, a paging message is sent over a wireless interface to a multiplicity of cells, in order to detect the particular cell a mobile station is currently located.

In previous systems, problems occurred as mobile stations transitioned between modes. For instance, if a MIP tunneling agent received new data from a mobile station when the link with the mobile station was in idle mode, new data might not be delivered to the mobile station because the mobile station might move out of the current access point domain during an idle mode, and not report its new location to the agent.

Previous systems also had other limitations. For instance, previous systems often used a central controller to maintain the location information and issue pages to mobile stations. The use of a central controller for paging and processing location updates created addition administrative overhead, increased latency within the system, and generally degraded system performance. Additionally, previous paging and location update schemes were not portable between systems utilizing different technologies, thereby requiring that each system have its own technology-specific implementation.

Figure 1:
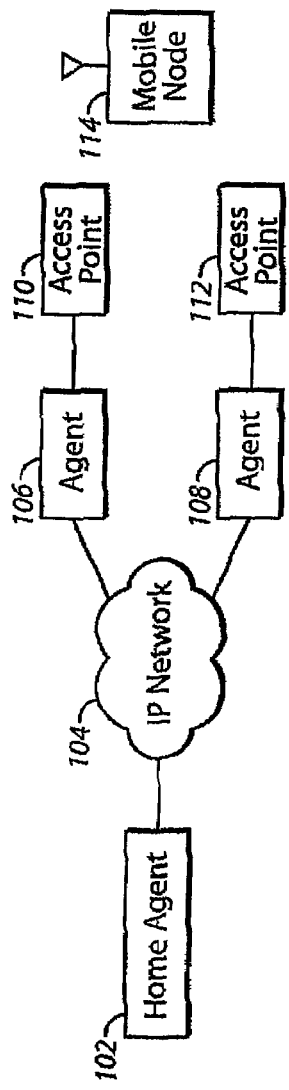
FIG. 1 is block diagram of a system for paging and processing location updates for mobile stations according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method for paging and processing location updates from mobile stations in, for example, a Mobile Internet Protocol (MIP) network decentralizes paging and location update functions. In the approaches described herein, a centralized controller is no longer required for these functions since any mobility agent may communicate with any other mobility agent to page a mobile station or to receive location updates from a mobile station. Moreover, these approaches are simple to implement and do not require the reprogramming of mobile stations, air interfaces, or other network elements such as home agents. In addition, the approaches are capable of interfacing various tunneling schemes with different underlying air interface wireless technologies in order to process location updates and paging requests.

In many of these embodiments, network access point and mobile station information is exchanged between a plurality of distributed mobility agents. The information exchange is initiated by a mobility agent associated with a first access point which is the last known network access point that has last communicated with the mobile station. The mobile station is paged from at least one network access point using an available air interface technology to interface with the mobile station and using the network access point and mobile station information. No centralized controller is used in the paging.

After the page is made, a page response may be received from the mobile station at a second network access point, which is associated with a second mobility agent. Upon receiving the page response from the mobile station, additional information is exchanged between the first and second mobility agents, for example, to indicate the location of the mobile station and to transfer context information related to the mobile station.

In others of these embodiments, incoming data destined for the mobile station is sent to the mobile station via the mobility agent associated with the last known network access point possibly using one of a plurality of tunneling technologies. Specifically, the incoming data may be forwarded along a temporarily established path from the first mobility agent associated with the last known network access point to the second mobility agent associated with the second network access point, from the second mobility agent to the second network access point, and from the second network access point to the mobile station.

Information is exchanged between the first and second mobility agents in order to redirect data to the second mobility agent. The identities of the agents may need to be determined. In one example, the identity of the first mobility agent is determined by sending a multicast query to a plurality of network access points. A message may also be sent to a network element (e.g., a home agent) to redirect data from the network element to the second mobility agent and, thereafter, to the mobile station.

In still others of these embodiments, a location update message is received at a second network access point. The location update message is sent from the mobile station using an available air interface technology. The reception of the location update message is communicated from the second network access point to a second mobility agent. An identity of a first mobility agent is then determined at the second mobility agent using the location update message and without the involvement of a centralized system controller.

Paging and receipt of the location update message may be performed using an air interface technology compliant with a Universal Mobile Telecommunication System (UMTS) compatible protocol, a Code Division Multiple Access-1X/Data Only (CDMA-1X/DO) compatible protocol and its evolutions for Data Only (DO) or Data-and-Voice (DV) communications, a Global System for Mobile Communications (GSM)-compatible protocol, or a IEEE 802.16 compatible protocol. Other protocols or air interface technologies may also be used to perform these functions.

Thus, a centralized controller is no longer required to be used for paging or location updates since any mobility agent may communicate with any other mobility agent to page a mobile station or to receive location updates from a mobile station. These approaches are simple to implement, do not require the reprogramming of mobile stations, air interfaces, or other network elements such as home agents, and are capable of interfacing various tunneling schemes with different underlying air interface wireless technologies.

Referring now to FIG. 1, one example of a system for providing paging and location updates is described. A home agent 102 is coupled to an IP network 104. The IP network 104 is coupled to a first mobility agent 106 and a second mobility agent 108. The first mobility agent 106 is connected to a first access point 110 and the second mobility agent 108 is connected to a second access point 112. A mobile station 114 may be communicatively coupled to either of the access points 110 and 112.

The home agent 102 is associated with the home network or sub-network of the mobile station 114. The mobile station 114 may be any type of mobile wireless device such as a cellular phone, pager, personal digital assistant (PDA), or laptop computer. Other examples of mobile stations are possible. The network 104 may be any type of network or combination of networks, for example, a network that supports the Internet Protocol (IP) or other IP-like protocols, such as, but not limited to, IPv4 or IPv6-based communications.

The mobility agents 106 and 108 are typically associated with sub-networks different from the mobile station's home sub-network where the mobile station can obtain wireless access. The access points 110 and 112 are any type of network access device that handles communication with the mobile station over the wireless link. In this regard, the access points 110 and 112 may be base stations and/or include base station functionality so that they may receive Radio Frequency (RF) signals from the mobile station 114 and pass these signals to the appropriate mobility agent 106 or 108.

In one example of the operation of the system of FIG. 1, network access point and mobile station information is exchanged between the mobility agents 106 and 108. In this example, the exchange is initiated by the first mobility agent 106 since it is associated with a last known network access point 110 that has communicated with the mobile station 114. The second mobility agent 108 associated with the second access point 112 is identified, for example, using the mobile station information and preconfigured knowledge of the location area. Subsequently, the mobile station 114 is paged from the second access point 112 using an available air interface technology to interface with the mobile station 114. If the mobile station 114 sends a response to the paging message, incoming data may be forwarded from the first mobility agent 106 to the second mobility agent 108, then from the second mobility agent 108 to the second network access point 112, and finally from the second network access point 112 to the mobile station 114. Additionally, information is exchanged between the first and second mobility agents 106 and 108 in order to effect a redirection of data destined for the mobile station 114 to the second mobility agent 108. In some examples, this may be accomplished by either the first mobility agent 106 or the second mobility agent 108 sending a registration request, such as a Mobile Internet Protocol registration request, to a network entity, such as a Mobile Internet Protocol Home Agent, to cause the network element to redirect the data destined for the mobile station 114 to the second mobility agent 108. This request may be sent without the mobile station 114 itself making an explicit request for sending such a registration request for data redirection.

Additionally, the first mobility agent 106 may contact multiple other mobility agents to conduct the above-mentioned actions related to paging. The order of contacting the other agents could be sequential, in parallel, or according to a phased strategy that is preconfigured. Other strategies of conducting the above-mentioned actions are possible.

In another example of the operation of the system of FIG. 1, a location update message is received at the second network access point 112. The location update message is sent from the mobile station 114 using an available air interface technology. The reception of the location update message is communicated from the second network access point 112 to a second mobility agent 108. An identity of a first mobility agent 106 is then determined at the second mobility agent 108 using the location update message and without the involvement of a centralized system controller. In one example, the identity of the first mobility agent 106 is determined by sending a multicast query to a plurality of network access points.

Context information related to the mobile station 114 may be exchanged between the first mobility agent 106 and the second mobility agent 108. Specifically, a context information transfer is made to the second mobility agent 108 because the second mobility agent is going to be the serving mobility agent after a location update. The identity of the first agent is obtained using, for example, a multicast query.

Figure 2:
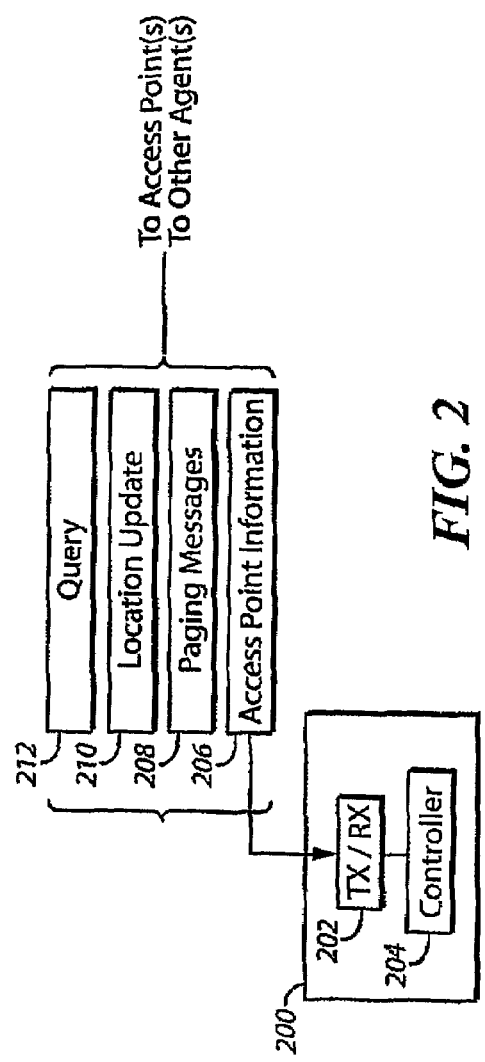
FIG. 2 is a block diagram of a mobility agent according to the present invention.

Referring now to FIG. 2, one example of a mobility agent is described. The mobility agent 200 includes a transmitter/receiver 202, which is coupled to a controller 204. The transmitter/receiver exchanges information with other access points and other mobility agents.

In another example, two interfaces could also be used instead of the single transmitter/receiver 202. In this case, one interface would communicate with access points and the other with other mobility agents and other network elements. In still another example, the mobility agent may be part of an access point and the mobility agent-to-access point interface would be internal to this combined device.

In one example of the operation of the mobility agent of FIG. 2, the controller 204 is programmed to exchange network access point information 206 with at least one other mobility agent at the transmitter/receiver 202. The controller 204 is further programmed to form and send control messages 208 at the output of the transmitter/receiver 202 in order to initiate paging of the mobile station. In another example of the operation of the mobility agent of FIG. 2, upon receiving a first control message from another mobility agent, the controller 204 is programmed to notify the access point to page the mobile station. In yet another example, the controller 204 is programmed to notify the mobility agent that sent the first control message upon receiving a notification from the access point that the mobile station has responded to a paging message.

In another example of the operation of the mobility agent of FIG. 2, the controller 204 is programmed to receive location update information 210 from the mobile station at the input of the transmitter/receiver 202 and to determine an identity of an initial mobility agent formerly associated with the mobile station without the involvement of a centralized system controller. In this regard, a multicast query 212 may be transmitted at the output of the transmitter/receiver 202 in order to determine an identity of the initial mobility agent. The controller 204 is further programmed to effect a redirection of data destined for the mobile station to itself. In some examples, this may be accomplished by the controller 204 sending a registration request to a network entity to cause it to redirect the data destined for the mobile station to the mobility agent. In some examples, this registration request may be sent to the controller 204 without the mobile station making an explicit request for sending such a registration request for data redirection.

The mobility agent may be implemented in a variety of ways. For example, it may be implemented on a single, physical computing platform or be functionally executed by multiple computing platforms.

Figure 3:
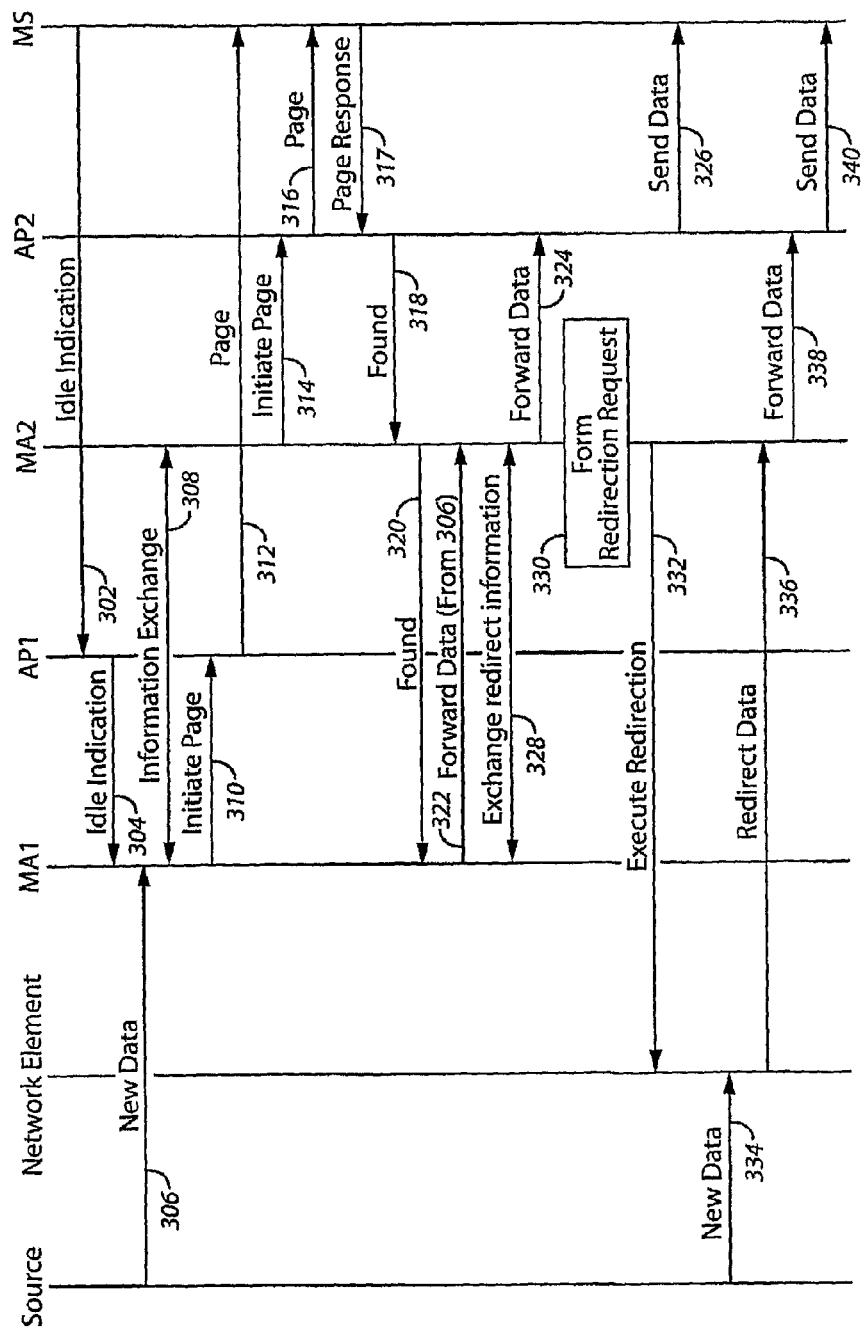
FIG. 3 is call flow diagram of an approach for paging mobile stations according to the present invention.

Referring now to FIG. 3, one example of an approach for paging a mobile station is described. In this example, a mobile station (MS) enters idle mode and new data arrives for delivery to the mobile station (MS). The mobile station (MS) may operate at a first access point (AP1) (associated with a first mobility agent (MA1)) or at a second access point (AP2) (associated with a second mobility agent (MA2)). At step 302, an idle indication is sent from the mobile station (MS) to the first access point (AP1). At step 304, the idle indication is sent from the first access point (AP1) to the first mobility agent (MA1). At step 306, new data arrives from a data source, for example, from a home agent at the first mobility agent (MA1). At step 308, information is exchanged between the first mobility agent (MA1) and a second mobility agent (MA2).

At step 310, the first mobility agent (MA1) sends an initiate page request to the first access point (AP1). In response, the first access point (AP1) pages the mobile station (MS) at step 312.

In another example, following the exchange of information at step 308, the second mobility agent (MA2) sends an initiate page request to the second access point (AP2) at step 314. At step 316, the second access point (AP2) sends a page to the mobile station (MS). At step 317, a page response is sent to the second access point (AP2) from the mobile station (MS). At step 318, a mobile station found message is sent from the second access point (AP2) to the second mobility agent (MA2) to indicate that the mobile station (MS) has been found. At step 320, the second mobility agent (MA2) sends an indication to the first mobility agent (MA1) that the mobile station (MS) has been found.

At step 322, the first mobility agent (MA1) forwards data (such as the data that arrived at step 306 and possibly new data) to the second mobility agent (MA2). At step 324, the second mobility agent (MA2) forwards data destined for the mobile station (MS) to the second access point (AP2). At step 326, the second access point (AP2) sends the data to the mobile station (MS). At step 328, the first and second mobility agents (MA1 and MA2) exchange information related to the mobile station (MS) (such as a home IP address of the mobile station (MS) or the IP address of a Mobile IP agent).

At step 330, the second mobility agent (MA2) effects a redirection of data by forming an execute redirection request (e.g., a Mobile Internet Protocol registration request) using the information exchanged in step 328. This is sent to a network element (e.g., a Mobile Internet Protocol home agent) at step 332. At step 334, new data arrives at the network element. At step 336, this new data is redirected to the second mobility agent (MA2). At step 338, the new data is forwarded from the second mobility agent (MA2) to the second access point (AP2). At step 340, the new data is sent from the second access point (AP2) to the mobile station (MS).

Figure 4:
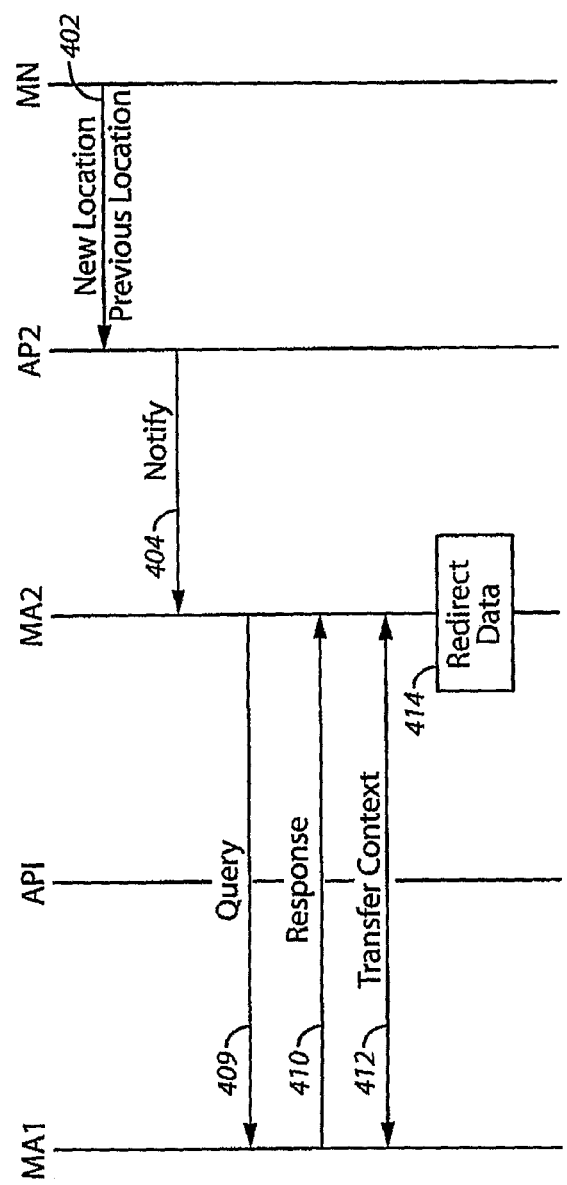
FIG. 4 is a call flow diagram of an approach of processing location updates for mobile stations according to the present invention.

Referring now to FIG. 4, one example of an approach for processing location updates for a mobile station (MS) is described. In this example, a mobile station (MS), which last contacted the network in the domain of the first access point (AP1), moves in idle mode from the domain of a first access point to the domain of a second access point (AP2). The first access point (AP1) is associated with a first mobility agent (MA1) and the second access point (AP2) is associated with a second mobility agent (MA2). At step 402, the mobile station (MS) sends a message to the second access point (AP2). The message indicates the new location of the mobile station (MS) to its new access point, in this case, the second access point (AP2). The mobile station (MS) also indicates its previous location area identifier (ID).

At step 404, the second access point (AP2) notifies the second mobility agent (MA2) that the mobile station (MS) has reported a location update and provides the previous location area ID given by the mobile station (MS). Then, the second mobility agent (MA2) needs to discover the identity of the mobility agent of the last known access point of the mobile station (MS), i.e., the first mobility agent. At step 409, the second mobility agent (MA2) issues a multicast query to all mobility agents in the previous location area to discover the identity of the previous mobility agent of the mobile station (MS). To facilitate the multicast query, an IP multicast group can be set up for each location area with a unique multicast address. The second mobility agent (MA2) can discover the multicast address of the multicast group of the previous location area through, for example, Domain Name Server (DNS) lookup or the Service Location Protocol (SLP). In response, the second mobility agent (MA2) sends the query to the multicast address of the previous location area. At step 410, the first mobility agent (MA1) receives the query and responds to the second mobility agent (MA2). At step 412, context information is exchanged between the first and second mobility agents (MA1 and MA2). For example, the IP address and wireless link context information may be transferred. Other examples of context information may also be exchanged. At step 414, the mobility agent effects a redirection of data such that any new data, whenever it arrives, will be directed to the second mobility agent (MA2).

Thus, in the approaches described herein, a centralized controller is no longer required to be used for paging or location update purposes since any mobility agent may communicate with any other mobility agent to page a mobile station or to receive location updates from a mobile station. These approaches are simple to implement and do not require the reprogramming of mobile stations, air interfaces, or home agents. In addition, the approaches are capable of interfacing various tunneling schemes with different underlying air interface wireless technologies in order to handle location updates and paging requests.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of paging a mobile station comprising:
   exchanging mobile station information between a plurality of distributed mobility agents, the exchange being initiated by a mobility agent of a last known network access point that has communicated with the mobile station;
   paging the mobile station from at least one network access point associated with a second mobility agent of the plurality of distributed mobility agents using an available air interface technology to interface with the mobile station and using the mobile station information;
   receiving a page response from the mobile station at a second network access point associated with the second mobility agent;
   upon receiving the page response from the mobile station, exchanging information between the second mobility agent associated with the second network access point and the mobility agent of the last known access point; and
   sending incoming data to the mobile station via the mobility agent of the last known network access point; and
   determining an identity of the mobility agent of the last known network access point that has communicated with the mobile station by the second mobility agent by sending a multicast query from the second mobility agent to a plurality of network access points.

2. The method of claim 1 wherein sending incoming data comprises sending data from the mobility agent of the last known network access point to the second mobility agent associated with the second network access point, and from the second mobility agent associated with the second network access point to the mobile station.

3. A mobility agent of a last known network access point that has communicated with a mobile station comprising:
   a receiver having an input;
   a transmitter having an output; and
   a controller coupled to the receiver and the transmitter, the controller programmed to:
      exchange mobile station information with at least a second mobility agent at the receiver and transmitter, the exchange being initiated by the mobility agent of the last known network access point that has communicated with the mobile station,
      the controller further programmed to form and send control messages at the output of the transmitter to initiate paging of the mobile station,
      receive a page response from the mobile station at a second network access point associated with the second mobility agent;
      upon receiving the page response from the mobile station, exchange information between the second mobility agent associated with the second network access point and the mobility agent of the last known access point; and
      send incoming data to the mobile station via the mobility agent of the last known network access point; and
      wherein an identity of the mobility agent of the last known network access point that has communicated with the mobile station is determined by the second mobility agent by sending a multicast query from the second mobility agent to a plurality of network access points.

4. The mobility agent of claim 3 wherein the controller is further programmed to, upon receiving a control message from another mobility agent via the receiver, send a communication to an associated access point via the transmitter to cause the associated access point to page the mobile station.

5. The mobility agent of claim 3 wherein the control messages are sent to the at least second mobility agent.

6. The mobility agent of claim 3 wherein the controller is further programmed to effect a redirection of incoming data destined for the mobile station.

* * * * *